United States Patent [19]
Muzzarelli

[11] Patent Number: 5,916,352
[45] Date of Patent: Jun. 29, 1999

[54] COMPLETE SELF-CONTAINED MULTIPURPOSE DAIRY PROCESSOR UNIT FOR MILK DERIVATIVES PRODUCTION

[75] Inventor: Gabriele Muzzarelli, Casinalbo, Italy

[73] Assignee: Farmer Engineering Gesellschaft M.B.H., Vienna, Austria

[21] Appl. No.: 08/793,230

[22] PCT Filed: Aug. 1, 1995

[86] PCT No.: PCT/EP95/03062

§ 371 Date: May 9, 1997

§ 102(e) Date: May 9, 1997

[87] PCT Pub. No.: WO96/04782

PCT Pub. Date: Feb. 22, 1996

[30] Foreign Application Priority Data

Aug. 12, 1994 [IT] Italy .................................. MO94U0035

[51] Int. Cl.⁶ .................................. A01J 25/00; A23C 3/03
[52] U.S. Cl. .................................. 99/453; 99/460; 99/483; 165/74; 165/77; 165/109.1; 366/144; 366/147
[58] Field of Search ........................... 99/452, 453, 455, 99/460, 464, 466, 470, 483, 348; 366/144, 147, 149; 165/64, 72, 74, 77, 86, 92, 109.1, 115, 136, 169; 426/36, 34, 581–583

[56] References Cited

U.S. PATENT DOCUMENTS

| | | |
|---|---|---|
| 1,914,494 | 6/1933 | Feldmeier . |
| 2,078,000 | 4/1937 | Jensen . |
| 2,738,170 | 3/1956 | Zamboni . |
| 3,893,811 | 7/1975 | Good et al. ........................ 165/109.1 |
| 4,667,590 | 5/1987 | Balaam et al. ........................ 99/470 |
| 4,669,254 | 6/1987 | Muzzarelli ........................ 99/453 X |
| 4,679,497 | 7/1987 | Tomatis ........................ 99/455 |
| 4,964,333 | 10/1990 | Bravo ........................ 99/453 X |
| 5,671,662 | 9/1997 | Cocchi et al. ........................ 99/453 |

FOREIGN PATENT DOCUMENTS

| | | |
|---|---|---|
| 0620977 | 10/1994 | European Pat. Off. . |
| 1096074 | 6/1955 | France . |
| 150341 | 4/1904 | Germany . |

*Primary Examiner*—Timothy F. Simone
*Attorney, Agent, or Firm*—Steinberg & Raskin, P.C.

[57] ABSTRACT

A complete self-containing multipurpose dairy processor unit in which a liquid is treated including a hot-water or steam generator and a heat exchanger immersible in the liquid to be treated and selectively feedable when immersed in the liquid being treated with hot water, steam or cold water depending on whether heat is to be transferred to the liquid to be treated or removed from the liquid to be treated, the hot water or steam being produced by the generator device. A generator including a turbine produces a flow within the liquid to be treated to cause the liquid to pass over the heat exchanger. The turbine is a variable-speed turbine which forces the liquid from a location below the heat exchanger upward into and through the heat exchanger.

14 Claims, 2 Drawing Sheets

COMPLETE SELF-CONTAINED MULTIPURPOSE DAIRY PROCESSOR UNIT FOR MILK DERIVATIVES PRODUCTION

FIELD OF THE INVENTION

This invention relates to a complete self-contained multipurpose dairy processor unit for milk derivatives production for bovine, buffalo, sheep and goat holdings and for public-access farms.

BACKGROUND OF THE INVENTION

Various types of plants for milk conversion in small quantity are known, constructed according to the classical scheme of the dairy farm and based on a coagulation vessel, the walls of which have an interspace through which hot or cold water is circulated to achieve heat transfer with the milk or whey contained in it. These vessels are sometimes provided with mechanical means for stirring and cutting the curd.

The use of this interspaced coagulation vessel usually requires two specific hot or cold water feed systems which very often require a considerable time for accumulating the energy required for the process. They are always in the form of plants composed of piping, valving, connection fittings, hydraulic pumps and reservoirs requiring particular plant design and installation, with considerable cost and processing time, as the milk to be processed, contained in the coagulation vessel, keeps the entire plant engaged until the end of the entire coagulation process. These plants are hence designed for specific milk quantities and are able to process only such specific milk quantities at a time.

OBJECTS AND SUMMARY OF THE INVENTION

U.S. Pat. No. 2,078,000 discloses an apparatus for thermal treatment of liquids, particularly milk, comprising a heat exchanger device in the form of a coil which can be immersed in the liquid to be trated. The coil is selectively feedable with hot water, steam, or cold water, depending on whether heat is to be transferred to the liquid or removed from it. The coil has a vertical axis around which it can rotate in order to improve the heat transmission. However, this apparatus is unsuitable for producing cheeses. In fact such a coil is unable for generating an effective flow in the liquid. Therefore, if the liquid to be trated is a curd (in which lumps of casein are dispersed in a liquid phase) from which a cheese has to be obtained, the lumps of casein adhere to the coil and degrades ("burn") thus compromising the wanted result. Furthermore, within a short time the quantity of casein on the coil also hinders the mechanical function of the coil which in practice is no longer able to generate any flow.

An object of the present invention is to provide the user with a complete self-contained multipurpose dairy processor unit for the production of milk derivatives, which allows the sequential processing of several milk quantities in several simple containers not forming part of the processor unit, with considerable utilization versatility and in any environment, while satisfying health regulations.

Further objects of the invention are:

from the technical viewpoint, to advantageously replace the many plants and machines of the traditional cheese dairy, so achieving independence from the milk quantities to be processed;

from the technological viewpoint, to enable all the processes of any cheese dairy to be effected, to obtain all types of cheese both from unpasteurized and from pasteurized milk, buttermilk curd, butter, yoghurt, etc.;

from the time viewpoint, to have available a processor unit which is of immediate use, which enables the coagulation time to be drastically reduced, and allows processing to be effected in sequence on several milk containers, which may be of different capacities.

A further object of the invention is to provide a dairy processor unit which is easy to clean, so offering maximum guarantee of hygiene and avoiding contamination of the liquid (milk or whey) to be treated, and is simple and economical to operate, without the use of specialized labour or complicated technologies.

The invention hence consists of having concentrated in a single processor unit all the heat transfer, physical-chemical, microbiological and mechanical functions currently performed in the various sectors and plants of a traditional cheese dairy, while satisfying health regulations and without modifying the technology of traditional cheeses.

These and further objects which will be apparent hereinafter are attained by a dairy processor unit comprising:

a hot-water or steam generator device (14);

a heat exchanger device (18) immersible in the liquid to be treated and selectively feedable with hot water or steam produced by the hot-water or steam generator device (14), or with cold water, depending on whether heat is to be transferred to the liquid to be treated or removed from it;

means to generate, within the liquid to be treated, a forced flow which grazes the heat exchanger (18);

characterized in that the hot-water or steam generator device (14) is of the instantaneous type; and the means to generate within the liquid a forced flow is a variable-speed turbine which draws the liquid form the below and expels it through the exchanger (18).

According to one embodiment of the present invention, mechanical means for stirring and cutting the curd can be connected to the flow generating means.

In this manner a complete self-contained multipurpose dairy processor unit is obtained. It should be noted that the term "cold water" means water the temperature of which is not substantially higher than ambient. Water having a temperature satisfying this requirement is for example mains water, well water or spring water.

The hot water or steam generator is conveniently of the type using liquid or gaseous fuel, and provided with operating and control means powered by the electric mains or by an electrical generator unit.

The lifting means can be operated either manually (in which case it is conveniently of the counterweighted type to limit operator fatigue), or by a pneumatic or hydraulic actuator, or by a geared motor unit powered by the electric mains or by the said electrical generator unit. The turbine for generating flow within the liquid to be treated can also be operated by a geared motor powered in the same manner.

The various components of the processor unit according to the present invention can be mounted on one and the same support structure or base.

To allow the processor unit to be easily moved, the said structure can be provided with wheels to allow it to be moved by pushing.

If the amount of movement required of the processor unit is considerable, it can be motorized for this purpose and provided with a driver's position, to finally assume the form of an actual motor vehicle with an internal combustion engine.

According to a modified embodiment of the present invention, the heat exchanger device can consist of several heat exchangers, each provided with a turbine. Such a modified embodiment can be useful if the mass of liquid to be treated is considerable.

According to a further modified embodiment of the present invention, the lifting means can also consist of a monorail, possibly directionable, with a hoist from which the heat exchanger and relative turbine are suspended.

The processor unit can also be provided with a conventional control device, for example of microprocessor type, to totally or partially automate its operation.

BRIEF DESCRIPTION OF THE DRAWINGS

Further characteristics and advantages of the invention will be more apparent from the description of one embodiment thereof given hereinafter with reference to the accompanying drawings, on which

DETAILED DESCRIPTION OF THE INVENTION

Figure 1:
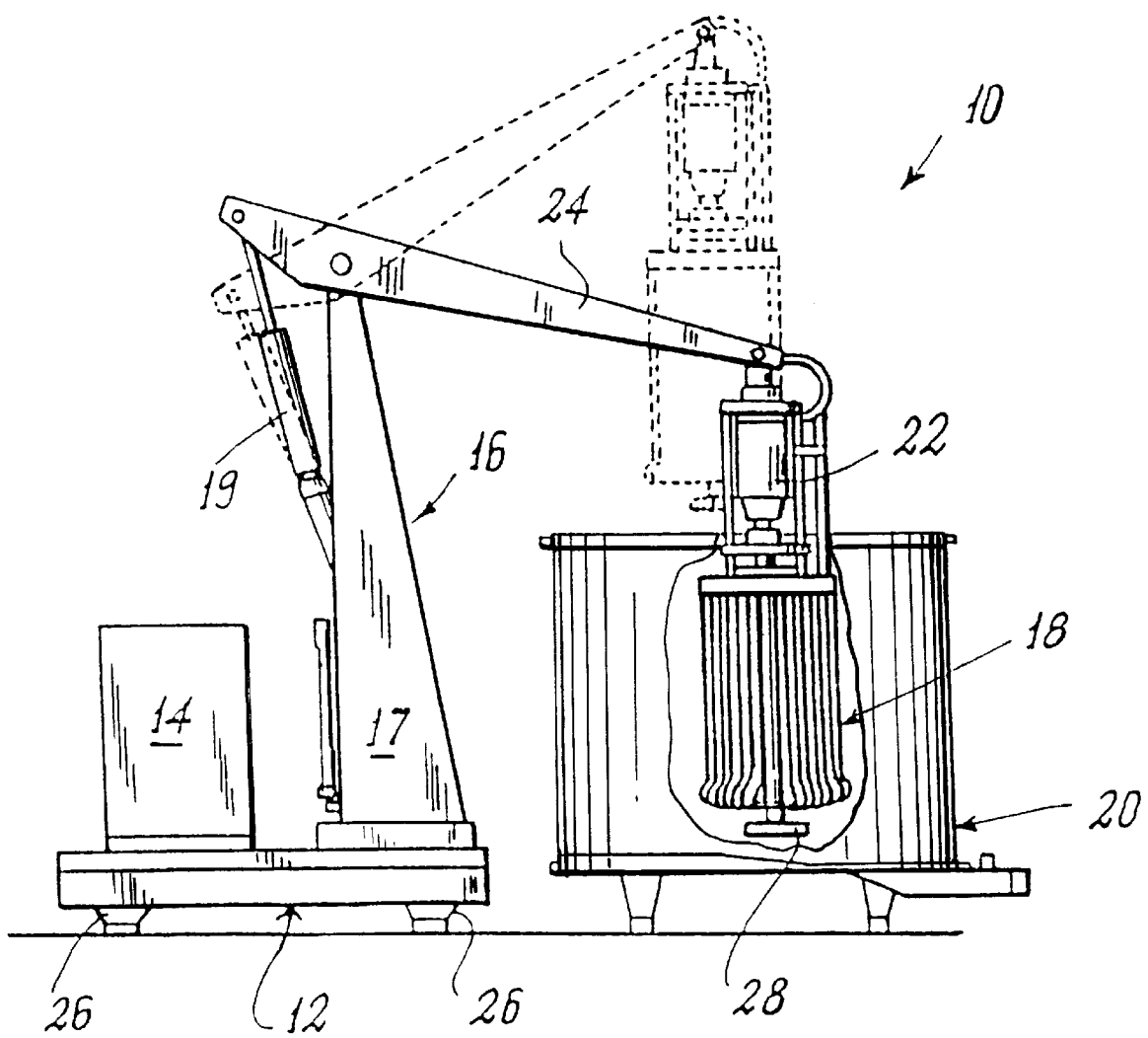
FIG. 1 shows a very schematic side elevational view of the complete self-contained dairy processor unit according to the present invention.
Figure 2:
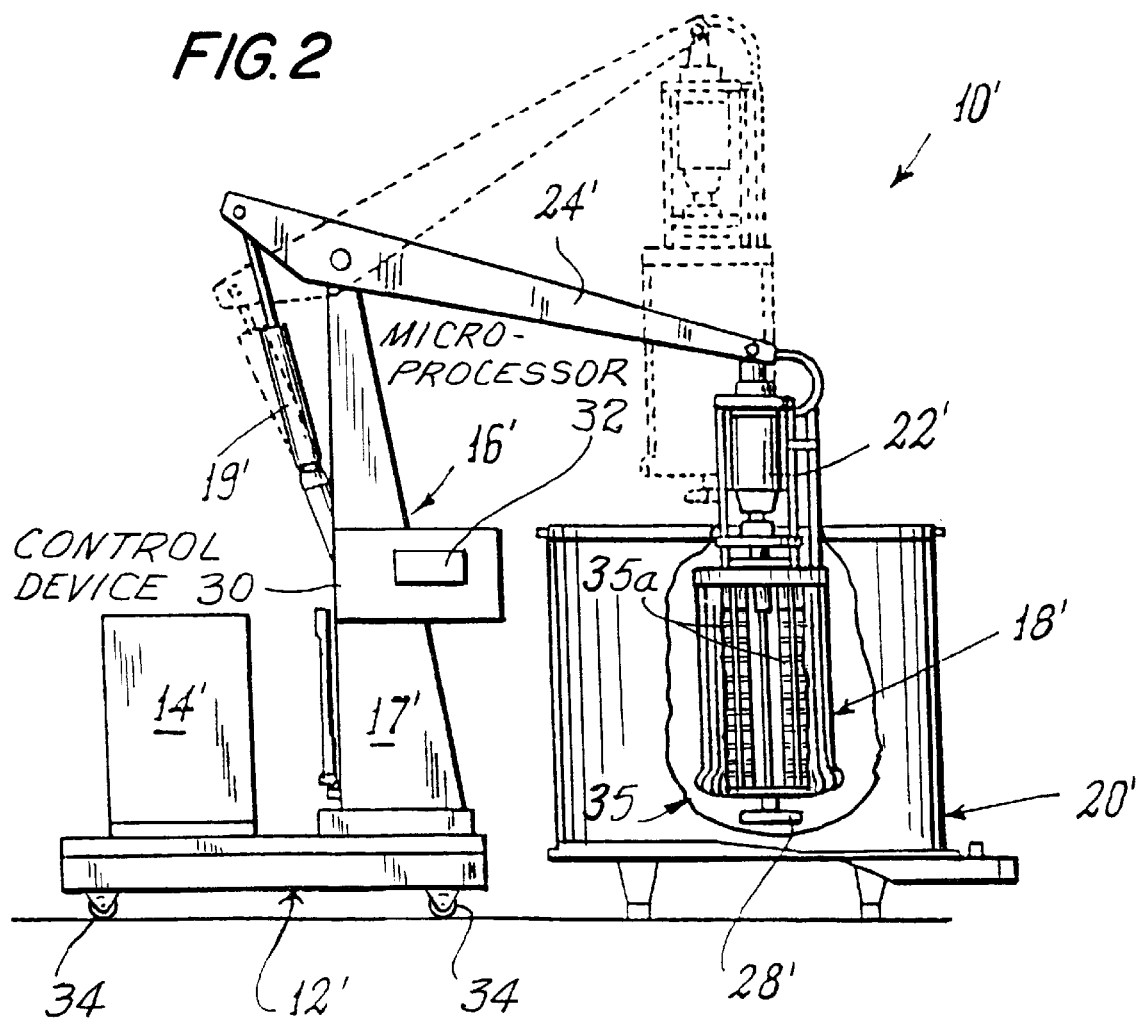
FIG. 2 shows a schematic side elevational view of the complete self-contained dairy processor unit according to the invention including a variable speed turbine (and wherein the same elements of FIG. 1 are primed)

As can be seen from the figure, the processor unit 10 comprises a base 12 carrying an instantaneous steam generator 14. The base also carries a lifting means 16, from the rotatable arm 24 of which there is suspended a heat exchanger 18, within the tube bundle of which there is coaxially positioned a variable speed turbine 35 (FIG. 2 and which includes vanes 35a as is known in the art) which generates a flow within the liquid by drawing liquid from below to then expel it laterally and radially through the vertically extending tube bundle. A heat exchanger of this type is for example described in Italian patent application No. MO93A 000005 in the name of the present applicant and entitled a "Radial Dynamic Heat Exchanger of Immersion Type".

Said turbine is supported by the heat exchanger 18 and is operated by a geared motor 22 positioned above the heat exchanger 18.

As can be seen from the figure, the lifting means 16 basically consists of an upright 17, to the upper end of which there is hinged an arm 24 operated by a cylinder-piston mechanism 19 via a suitable control unit 30 (FIG. 2 and which includes vanes 35a as is known in the art) carried by the base 12. It should however be noted that the lifting means can also be operated in a different manner, for example hydraulically or by a geared motor, or even manually if provided with a counterweight to limit operator fatigue. As already stated it can also be in the form of a monorail, possibly directionable, with a relative lifting hoist.

As shown in the figure, the arm 24, and consequently the heat exchanger 18, can assume two significant positions, namely a working or lowered position in which the heat exchanger 18 is immersed in the liquid to be treated contained in the vessel 20 (this position shown in the figure by full lines), and a raised position in which the heat exchanger 18 is out of the vessel (shown by dashed lines in the figure).

Figure 3:
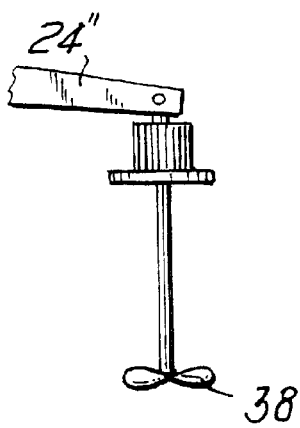
FIG. 3 shows a view of the arm of the dairy processor unit in accordance with the invention including a stirrer device (wherein the same element of FIG. 1 is double primed)
Figure 4:
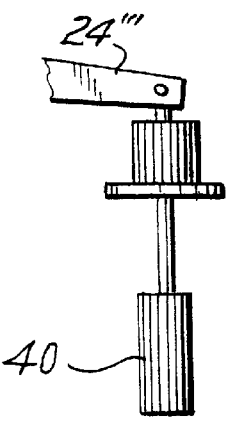
FIG. 4 shows a view of the arm of the dairy processor unit in accordance with the invention including curd cutting means (wherein the same element of FIG. 1 is triple primed).

As can be seen from the figure, the shaft of the turbine (not visible) projects beyond the lower edge of the heat exchanger 18 and carries fixed thereto a connection element 28 enabling the shaft to be connected to a stirrer means 38 (FIG. 3) or a curd cutting means 40 (FIG. 4).

For simplicity, the figure does not show the hydraulic connections or the electrical installation, or the valve enabling hot water or steam to pass into the heat exchanger rather than cold water.

These are however obvious to an expert of the art.

As can be seen from the figure, the base 12 is provided with adjustable feet 26. As stated, these can be replaced or supplemented at their sides with wheels 34 (FIG. 2) to facilitate the movement of the processor unit 10.

It should be noted that the vessel 20 normally does not form part of the processor unit 10, as it can be any vessel provided it is suitable for the purpose and satisfies the health regulations applicable to the particular case. In particular, it does not need to be a traditional copper vessel of interspaced type, with all the advantages which this brings.

The operation of the processor unit 10 will now be briefly described, although this should be apparent from the aforegoing. It will be assumed that the heat exchanger 18 is already immersed in the liquid (milk or whey) contained in the vessel 20 and that the turbine enclosed within it is in operation. As soon as the instantaneous hot water or steam generator 14 feeds hot water or steam into the heat exchanger 18 via the relative hydraulic circuit, the heat exchanger 18 begins to transfer heat to the liquid in which it is immersed. This means that at the outlet of the heat exchanger 18 there is condensate which is returned to the instantaneous hot water or steam generator 14 to be retransformed into hot water or steam, to hence repeat the cycle.

If instead the heat exchanger 18 is not immersed in the liquid and the steam generator 14 is operated, the heat exchanger temperature tends to rise to a value close to the temperature of the steam passing through it, with the significant result of sterilizing and disinfecting it.

As already stated, the heat exchanger 18 can also operate in the reverse direction. In this respect it can be used to cool the liquid in which it is immersed merely by closing the steam feed and feeding it with cold water, for example mains water (which normally has a temperature not exceeding 15° C.) or spring, well or similar water. Consequently the heat exchanger 18 then removes heat from the liquid in which it is immersed, to cool it to the required temperature (which for the applications of interest is substantially higher than mains water temperature). The heat exchanger and the turbine enclosed within it, ie those parts of the processor unit 10 which come into contact with the liquid to be treated, are conveniently of stainless steel, this material being preferred from the hygiene viewpoint. This eliminates one of the problems of the traditional dairy industry, in which the vessel itself, necessarily of copper, has to be heated to transfer sufficient heat per unit of time to the liquid to enable the required result to be achieved. The result is that copper particles are transferred to the final dairy product (Japan has recently refused grain consignments because of excessive copper content under Japanese law). In our case, as the heat exchanger used results in a very high heat transfer rate, it is no longer necessary to use copper for those parts transferring heat to the treated liquid, so that the heat exchanger tubes can be constructed of a material of lower thermal conductivity than copper, such as stainless steel, hence overcoming the problem of copper particle release.

As will be apparent to the expert of the art, the described processor unit is of considerable versatility and achieves a very high heat transfer rate because of the presence of a radial dynamic heat exchanger of immersion type. This significantly reduces the time and cost of the production cycle without however changing the typicality of the traditional manufacturing process. In addition the processor unit according to the invention enables any production requirement to be satisfied (from the individual shepherd level to the large industrial cheese dairy), with a truly significant energy saving over a traditional plant.

This also results in a lesser environmental impact due to the significant reduction in burnt gas emission, complete elimination of water consumption for the coagulation, a considerable reduction in detergent effluent, and a significant reduction in the area required for production. Furthermore the processor unit of the invention enables the traditional fixed-volume copper vessel of interspaced type to be completely dispensed with, the vessel now being a simple vessel of any material suitable for food use (such as stainless steel or food-suitable plastics).

I claim:

1. A complete self-containing multipurpose dairy processor unit in which a liquid is treated, comprising:

a generator for generating hot-water or steam, a heat exchanger immersible in the liquid to be treated and selectively feedable when immersed in the liquid to be treated with hot water, steam or cold water depending on whether heat is to be transferred to the liquid to be treated or removed from the liquid to be treated, the hot water or steam being produced by said generator, and means for generating a forced flow within the liquid to be treated to cause the liquid to pass through said heat exchanger, said generating means comprising a variable-speed turbine operable at different speeds and arranged to force the liquid from a location below said heat exchanger upward into and through said heat exchanger.

2. The processor unit of claim 1, wherein said generator is of the liquid or gaseous fuel type.

3. The processor unit of claim 1, further comprising lifting means for lifting said heat exchanger from a first position in a container in which the liquid to be treated is placed to a second position out of the container.

4. The processor unit of claim 3, wherein said lifting means comprise a pneumatic or hydraulic actuator.

5. The processor unit of claim 3, wherein said generating means further comprise an electrically powered, geared motor suspended on said lifting means for rotating said turbine at variable speeds.

6. The processor unit of claim 1, further comprising a single support structure, said generator, said heat exchanger and said generating means being mounted on said support structure.

7. The processor unit of claim 6, further comprising wheels arranged on said support structure for enabling movement of said support structure.

8. The processor unit of claim 1, further comprising a control device for totally or partially automating operation of the processor unit.

9. The processor unit of claim 8, wherein said control device includes a microprocessor.

10. The processor unit of claim 1, wherein said turbine includes a shaft which projects beyond a lower edge of said heat exchanger, further comprising a connection element arranged on said shaft for enabling said shaft to be connected to a stirrer device or a curd cutting device.

11. The unit of claim 1, wherein said heat exchanger comprises a tube bundle, said turbine being situated in an interior of said tube bundle such that the liquid is forced by said turbine into the interior of said tube bundle and then laterally and radially outward between tubes of said tube bundle.

12. The unit of claim 6, wherein the liquid to be treated is situated in a container, said support structure being completely separated from the container.

13. A complete self-containing multipurpose dairy processor unit for the production of milk derivatives in which a liquid is treated, comprising:

a generator device for generating hot-water or steam, a heat exchanger device immersible in the liquid to be treated and selectively feedable when immersed in the liquid to be treated with hot water, steam or cold water depending on whether heat is to be transferred to the liquid to be treated or removed from the liquid to be treated, the hot water or steam being produced by said generator device, means for generating a forced flow within the liquid to be treated to cause the liquid to pass through said heat exchanger, said generating means comprising a turbine arranged to force the liquid from a location below said heat exchanger upward into and through said heat exchanger, a single support structure, said steam generator, said heat exchanger and said generating means being mounted on said support structure, and wheels arranged on said support structure for enabling movement of said support structure.

14. The unit of claim 13, wherein said heat exchanger comprises a tube bundle, said turbine being situated in an interior of said tube bundle such that the liquid is forced by said turbine into the interior of said tube bundle and then laterally and radially outward between tubes of said tube bundle.

* * * * *